(12) United States Patent
Horiuchi et al.

(10) Patent No.: US 10,228,129 B2
(45) Date of Patent: Mar. 12, 2019

(54) WASTE GASIFICATION MELTING APPARATUS AND WASTE GASIFICATION MELTING METHOD USING THE SAME

(71) Applicant: JFE Engineering Corporation, Tokyo (JP)

(72) Inventors: Satoshi Horiuchi, Tokyo (JP); Keiichi Okuyama, Tokyo (JP); Takeshi Uchiyama, Tokyo (JP); Hajime Akiyama, Tokyo (JP); Junya Watanabe, Tokyo (JP); Takashi Nakayama, Tokyo (JP); Kazumasa Wakimoto, Tokyo (JP); Akio Shimomura, Tokyo (JP)

(73) Assignee: JFE Engineering Corporation, Tokyo (JP)

( * ) Notice: Subject to any disclaimer, the term of this patent is extended or adjusted under 35 U.S.C. 154(b) by 617 days.

(21) Appl. No.: 14/780,385

(22) PCT Filed: Mar. 27, 2014

(86) PCT No.: PCT/JP2014/058763
§ 371 (c)(1),
(2) Date: Sep. 25, 2015

(87) PCT Pub. No.: WO2014/157466
PCT Pub. Date: Oct. 2, 2014

(65) Prior Publication Data
US 2016/0053992 A1 Feb. 25, 2016

(30) Foreign Application Priority Data

Mar. 27, 2013 (JP) ................................. 2013-065820

(51) Int. Cl.
*F23G 5/50* (2006.01)
*F23L 7/00* (2006.01)
(Continued)

(52) U.S. Cl.
CPC ............... *F23G 5/50* (2013.01); *F23G 5/027* (2013.01); *F23G 5/24* (2013.01); *F23L 7/007* (2013.01);
(Continued)

(58) Field of Classification Search
None
See application file for complete search history.

(56) References Cited

FOREIGN PATENT DOCUMENTS

| JP | 09-060830 A | 3/1997 |
|----|-------------|--------|
| JP | 11-14025 A | 1/1999 |

(Continued)

OTHER PUBLICATIONS

International Search Report for PCT/JP2014/058763 dated Jun. 4, 2014.

*Primary Examiner* — David J Laux
(74) *Attorney, Agent, or Firm* — Bachman & LaPointe, PC (57) ABSTRACT

Problem to be Solved
To provide a waste gasification melting apparatus which, even if a fuel gas is used as an alternative to a part of the coke, the temperature of the coke bed can be sufficiently raised, and a method using the same.
Solution
A waste gasification melting apparatus including an oxygen rich air supply apparatus 14 for blowing oxygen rich air into a tuyere 5, and a fuel gas supply apparatus 15 for supplying a fuel gas to the tuyere 5, and a controller 16 for controlling the oxygen rich air supply apparatus 14; the oxygen rich air supply apparatus 14 mixing air and oxygen to prepare oxygen rich air and supply the oxygen rich air to the tuyere 5; and the controller 16 controlling the amount of air to be mixed and the amount of oxygen to be mixed in the oxygen rich air supply apparatus 14 so as to give an oxygen
(Continued)

concentration of the oxygen rich air in accordance with the amount of fuel gas supplied to the tuyere 5 from the fuel gas supply apparatus 15.

18 Claims, 2 Drawing Sheets

(51) Int. Cl.
    *F23G 5/027*     (2006.01)
    *F23G 5/24*     (2006.01)
    *C10J 3/72*     (2006.01)
    *C10J 3/08*     (2006.01)
    *C10J 3/20*     (2006.01)

(52) U.S. Cl.
    CPC .. *C10J 3/08* (2013.01); *C10J 3/20* (2013.01); *C10J 3/723* (2013.01); *C10J 2300/0946* (2013.01); *C10J 2300/0956* (2013.01); *C10J 2300/1606* (2013.01); *C10J 2300/1634* (2013.01); *C10J 2300/1671* (2013.01); *C10J 2300/1678* (2013.01); *C10J 2300/1846* (2013.01); *F23G 2200/00* (2013.01); *F23G 2201/701* (2013.01); *F23G 2202/20* (2013.01); *F23G 2204/101* (2013.01); *F23G 2204/103* (2013.01); *Y02E 20/344* (2013.01)

(56) References Cited

FOREIGN PATENT DOCUMENTS

| | | |
|---|---|---|
| JP | 2000-028122 A | 1/2000 |
| JP | 2001-027411 A | 1/2001 |
| JP | 2001-090923 A | 4/2001 |
| JP | 2006-242411 A | 9/2006 |
| JP | 2007-198635 A | 8/2007 |
| JP | 2010-065932 A | 3/2010 |
| JP | 2011-064382 A | 3/2011 |
| JP | 2012-163260 A | 8/2012 |

WASTE GASIFICATION MELTING APPARATUS AND WASTE GASIFICATION MELTING METHOD USING THE SAME

TECHNICAL FIELD

The present invention relates to a waste gasification melting apparatus including a waste gasification melting furnace of shaft furnace type having a coke bed to thermally decompose a waste and melt a thermal decomposition residue, and blowing oxygen rich air and a fuel gas into the waste gasification melting furnace from a tuyere provided in a lower section of the furnace, and a waste gasification melting method using the same.

BACKGROUND ART

As the technology for treating waste, such as city garbage or shredder dust, the method of waste melting treatment that thermally decomposes and burns the waste, and melts the thermal decomposition residue into slag, discharging it.

This treating method offers advantages that the waste can be thermally decomposed to be gasified, thereby allowing the combustion heat to be recovered, and after melting the thermal decomposition residue and discharging it as slag, the volume of the waste to be finally disposed can be reduced by making land-filling disposal or other. Such a melting treatment method is available in several types, and as one of them, the method is available which uses a waste gasification melting furnace of shaft furnace type, which is of vertical type.

This waste gasification melting furnace of shaft furnace type performs such a treatment as that in which the coke deposited in the lower section of the furnace is burned, and onto such coke bed at high temperature, the waste is charged to be thermally decomposed and partially oxidized for gasification, with the thermal decomposition residue being melted into slag (refer to Patent Document 1).

With the waste gasification melting furnace of shaft furnace type disclosed in Patent Document 1, the functions of the furnace body with a vertical and cylindrical shape are basically divided into three regions along the vertical direction from the viewpoint of function. In other words, in the lower section of the furnace, there is formed a high temperature combustion zone having a coke bed in which the coke is deposited; above this high temperature combustion zone, a waste layer is formed; and in the upper section of the furnace body above the waste layer, a freeboard section having a large space is provided.

With such a waste gasification melting furnace, in the respective three regions mentioned above, oxygen-containing gas is blown into the furnace. The high temperature combustion zone in the furnace lower section is provided with amain tuyere; through a gas feeding pipe which is connected to the main tuyere, oxygen rich air is blown into the furnace; and in the high temperature combustion zone, the coke charged and deposited in the coke bed is burned to provide a melting heat source for melting the thermal decomposition residue of the waste. In addition, the waste layer is provided with a sub-tuyere for blowing air to slowly fluidize the waste which has been charged and deposited, and thermally decompose and partially oxidize the waste. Further, the freeboard section is provided with a third-level tuyere for blowing air to partially burn a part of the thermal decomposition gas (combustible gas) generated with the waste being thermally decomposed, and thus to maintain the inside of the furnace at a prescribed temperature.

Thus, the waste gasification melting furnace of shaft furnace type is a provision which, within a single furnace, can perform both the thermal decomposition gasification treatment and the melting treatment of the waste as it falls in the furnace. The charged waste is thermally decomposed, thereby gas and residue being generated. In the lower section of the furnace, by blowing oxygen rich air from the main tuyere, the coke in the coke bed is burned, a high temperature combustion zone being formed, and the thermal decomposition residue of the waste is melted to be discharged as slag and metal. The coke bed causes the oxygen rich air from the main tuyere and the high temperature gas generated on the basis of the coke combustion to be passed through the voids produced between lumps of coke, and also functions as a high temperature fire grate which passes the molten slag and metal. The high temperature gas generated by the coke combustion in the high temperature combustion zone heats the waste in the waste layer formed above the high temperature combustion zone, the waste being thermally decomposed with the air being blown from the sub-tuyere, and the gas containing combustible gas generated by such thermal decomposition rises in the waste layer, passing through the freeboard section, to be discharged from a discharge flue provided in the upper section of the furnace into a secondary combustion chamber outside the furnace. The gas, containing a large quantity of combustible gas, is burned in the secondary combustion chamber, the heat being recovered at a boiler to generate steam, which is used for electric power generation, or the like. The gas discharged from the boiler is removed of relatively coarse dust particles by means of a cyclone separator; then is cooled by a temperature lowering apparatus; is removed of noxious gas through reaction with a harmful substance removing agent; and is subjected to an exhaust gas treatment, such as that for dust removal with a dust collector, being dissipated to the atmosphere from a smoke stack.

With such a waste gasification melting furnace, a coke bed in which coke is deposited is formed in the furnace bottom section, and the coke is burned to provide a heat source for melting the thermal decomposition residue, however, in recent years, there has been a demand for reducing the consumed quantity of coke to cut the carbon dioxide emission amount.

Then, it has been studied that a fuel gas, such as a natural gas, propane gas, and combustible gas generated by thermal decomposition in a waste gasification melting furnace, is utilized as an alternative to a part of coke, and for example, in the Patent Document 2, it is proposed to blow a fuel gas together with oxygen rich air from a main tuyere (blast tuyere).

In the Patent Document 2, a tuyere for feeding oxygen rich air into the furnace is provided such a way that the distal end of the tuyere is introduced deep into the furnace to be positioned in the coke bed. The fuel gas is supplied into a gas feeding pipe connected to the tuyere, being blown into the coke bed from the distal end of the tuyere together with the oxygen rich air to be burned, and the combustion heat of the fuel gas is utilized as a part of the melting heat source in the coke bed.

CITATION LIST

Patent Literature

Patent Document 1: Japanese Unexamined Patent Application Publication No. H09-060830
Patent Document 2: Japanese Unexamined Patent Application Publication No. 2001-090923

DISCLOSURE OF THE INVENTION

Problems to be Solved by the Invention

Even if, in order to decrease the consumed quantity of coke in the waste gasification melting furnace to cut a carbon dioxide emission amount, a fuel gas is blown as an alternative to a part of the coke as disclosed in the Patent Document 2, there will presented the following problems. The main component of a fuel gas, such as a natural gas, is a hydrocarbon, such as methane, which is blown into the lower section of the furnace to be thermally decomposed into CO and $H_2$ and burned. Examination of the heating value in the lower section of the furnace reveals that the quantity of heat (decomposing heat) which is absorbed from the circumference for such thermal decomposition is large; therefore, the heating value in the lower section of the furnace at the time of burning the coke and the fuel gas is smaller than the heating value in the furnace lower section at the time of burning only the coke, by the quantity of fuel gas decomposition heat which is absorbed from the circumference. Therefore, if the consumed quantity of coke is decreased, and in place of the decreased quantity of coke, a fuel gas is used, the heating value in the furnace lower section becomes smaller than the heating value in the furnace lower section at the time of burning only the coke, and the more the amount of coke supplied is decreased with the amount of fuel gas supplied being increased, the smaller the heating value in the furnace lower section will become. This results in that the temperature of the lower section of the furnace cannot be sufficiently raised, the thermal decomposition residue cannot be sufficiently melted, and the temperature of the molten slag as a melt of the thermal decomposition residue cannot be sufficiently raised, thereby the viscosity of the molten slag being increased with the fluidity being lowered, and the molten slag being unsatisfactorily discharged, which may cause hindrance to the operation.

The present invention has been made in view of such a situation, and it is intended to provide a waste gasification melting apparatus and a waste gasification melting method that use a fuel gas as an alternative to a part of coke; and that, even if, upon coke and a fuel gas being jointly used to obtain a heat source for melting the thermal decomposition residue, the consumed quantity of coke is decreased and the amount of fuel gas supplied is increased, the temperature of the furnace lower section can be sufficiently raised, the thermal decomposition residue can be sufficiently melted, and the temperature of the molten slag can be sufficiently raised.

Means for Solving the Problems

In accordance with the present invention, the above problems are solved by configuring the waste gasification melting apparatus and the waste gasification melting method as follows.

<Waste Gasification Melting Apparatus>

The waste gasification melting apparatus in accordance with the present invention includes a waste gasification melting furnace of shaft furnace type having a coke bed to thermally decompose a waste, and melt a thermal decomposition residue; an oxygen rich air supply apparatus for blowing oxygen rich air into the waste gasification melting furnace from a tuyere provided in a lower section of the furnace; and a fuel gas supply apparatus for blowing a fuel gas.

With such waste gasification melting apparatus, the present invention features that the oxygen rich air supply apparatus mixes air and oxygen to prepare oxygen rich air; and there is provided a controller for controlling the oxygen rich air supply apparatus, the controller controlling the amount of air to be mixed and the amount of oxygen to be mixed in the oxygen rich air supply apparatus so as to give an oxygen concentration of the oxygen rich air in accordance with the amount of fuel gas supplied to the tuyere from the fuel gas supply apparatus.

With the present invention, upon the consumed quantity of coke to be used as a heating source for melting the thermal decomposition residue in the waste gasification melting furnace being decreased, and in place of the decreased quantity of coke, a fuel gas being used, the controller controls the amount of air to be mixed and the amount of oxygen to be mixed in the oxygen rich air supply apparatus so as to give an oxygen concentration of the oxygen rich air in accordance with the amount of fuel gas supplied to the tuyere from the fuel gas supply apparatus.

The heating value in the lower section of the furnace at the time of burning the coke and the fuel gas is smaller than the heating value in the furnace lower section at the time of burning only the coke, by the quantity of fuel gas decomposition heat which is absorbed from the circumference. Then, it has been decided that the oxygen concentration of the oxygen rich air which is blown into the lower section of the furnace together with the fuel gas is enhanced as compared to that in the case of only the coke being burned, in other words, the ratio of nitrogen in the oxygen rich air is lowered to suppress the quantity of heat used for heating the nitrogen to a low value, thereby the temperature of the furnace lower section being maintained high such that melting of the thermal decomposition residue and temperature raising of the molten slag in the furnace lower section are properly performed. In correspondence to that the more the consumed quantity of coke is decreased with the amount of fuel gas supplied being increased, the smaller the heating value in the furnace lower section will become, when the amount of fuel gas supplied is to be increased, the oxygen concentration of the oxygen rich air is controlled so as to be enhanced for decreasing the ratio of nitrogen.

In this way, the oxygen concentration of the oxygen rich air is controlled in accordance with the amount of fuel gas supplied such that the quantity of heat generated by combustion of the fuel gas and the coke in the furnace lower section is a sufficient quantity of heat to completely melt the thermal decomposition residue and raise the temperature of the molten slag to a temperature suitable for discharging it from the furnace. As a result of this, upon the fuel gas being supplied as an alternative to a part of the coke, even if the consumed quantity of coke is reduced and the consumed quantity of fuel gas is increased, the temperature of the furnace lower section is maintained high without the quantity of heat generated in the furnace lower section being lowered as compared to that in the case of using the coke alone, whereby melting of the thermal decomposition residue and discharging of the melt can be smoothly carried out.

With the present invention, it is preferable that the controller control the oxygen concentration of the oxygen rich air prepared by the oxygen rich air supply apparatus to bring it to within a range given by the following Eq. (1) in accordance with the amount of fuel gas supplied.

$$0.343X+26.3 \le Y \le 0.4X+52 \qquad (1)$$

where

X: Amount of fuel gas supplied per ton of waste (kg/t)

Y: Oxygen concentration of oxygen rich air (vol. %)

In addition, with the present invention, it is preferable that the controller control the oxygen concentration of the oxygen rich air prepared by the oxygen rich air supply apparatus in the following way in accordance with the amount of fuel gas supplied: when the amount of fuel gas supplied per ton of waste is 1 kg to under 5 kg, the controller brings the oxygen concentration of the oxygen rich air to within a range of 28 vol. % to under 52 vol. %; when the amount of fuel gas supplied per ton of waste is 5 kg to under 10 kg, the controller brings the oxygen concentration of the oxygen rich air to within a range of 30 vol. % to under 54 vol. %; when the amount of fuel gas supplied per ton of waste is 10 kg to under 15 kg, the controller brings the oxygen concentration of the oxygen rich air to 31 vol. % to within a range of under 56 vol. %; when the amount of fuel gas supplied per ton of waste is 15 kg to under 20 kg, the controller brings the oxygen concentration of the oxygen rich air to within a range of 33 vol. % to under 58 vol. %; when the amount of fuel gas supplied per ton of waste is 20 kg to under 25 kg, the controller brings the oxygen concentration of the oxygen rich air to within a range of 35 vol. % to under 60 vol. %; when the amount of fuel gas supplied per ton of waste is 25 kg to under 30 kg, the controller brings the oxygen concentration of the oxygen rich air to within a range of 37 vol. % to under 62 vol. %; when the amount of fuel gas supplied per ton of waste is 30 kg to under 35 kg, the controller brings the oxygen concentration of the oxygen rich air to within a range of 38 vol. % to under 64 vol. %; and when the amount of fuel gas supplied per ton of waste is 35 kg to under 40 kg, the controller brings the oxygen concentration of the oxygen rich air to within a range of 40 vol. % to under 66 vol. %.

Upon the oxygen concentration of the oxygen rich air prepared by the oxygen rich air supply apparatus being to be controlled in accordance with the amount of fuel gas supplied, by performing the control such that the corresponding relationship between the amount of fuel gas supplied and the proper oxygen concentration range of the oxygen rich air that is indicated as above is satisfied, a sufficient quantity of heat to completely melt the thermal decomposition residue and raise the temperature of the molten slag to a temperature suitable for discharging it from the furnace can be reliably generated in the furnace lower section.

<Waste Gasification Melting Method>

With the waste gasification melting method in accordance with the present invention, upon thermally decomposing a waste and melting a thermal decomposition residue in a waste gasification melting furnace of shaft furnace type having a coke bed, a fuel gas is blown together with oxygen rich air into the waste gasification melting furnace from a tuyere provided in the lower section of the furnace.

With such a waste gasification melting method, the present invention features that air is mixed with oxygen to prepare oxygen rich air, and the amount of air to be mixed and the amount of oxygen to be mixed are controlled so as to give an oxygen concentration of the oxygen rich air in accordance with the amount of fuel supplied to the tuyere.

With the present invention, it is preferable that the oxygen concentration of the oxygen rich air be controlled to be brought to within a range given by the following Eq. (1) in accordance with the amount of fuel gas supplied.

$$0.343X+26.3 \le Y \le 0.4X+52 \quad (1)$$

where
X: Amount of fuel gas supplied per ton of waste (kg/t)
Y: Oxygen concentration of oxygen rich air (vol. %)

With the present invention, it is preferable that the oxygen concentration of the oxygen rich air be controlled in the following way in accordance with the amount of fuel gas supplied: when the amount of fuel gas supplied per ton of waste is 1 kg to under 5 kg, the controller brings the oxygen concentration of the oxygen rich air to within a range of 28 vol. % to under 52 vol. %; when the amount of fuel gas supplied per ton of waste is 5 kg to under 10 kg, the controller brings the oxygen concentration of the oxygen rich air to within a range of 30 vol. % to under 54 vol. %; when the amount of fuel gas supplied per ton of waste is 10 kg to under 15 kg, the controller brings the oxygen concentration of the oxygen rich air to within a range of 31 vol. % to under 56 vol. %; when the amount of fuel gas supplied per ton of waste is 15 kg to under 20 kg, the controller brings the oxygen concentration of the oxygen rich air to within a range of 33 vol. % to under 58 vol. %; when the amount of fuel gas supplied per ton of waste is 20 kg to under 25 kg, the controller brings the oxygen concentration of the oxygen rich air to within a range of 35 vol. % to under 60 vol. %; when the amount of fuel gas supplied per ton of waste is 25 kg to under 30 kg, the controller brings the oxygen concentration of the oxygen rich air to within a range of 37 vol. % to under 62 vol. %; when the amount of fuel gas supplied per ton of waste is 30 kg to under 35 kg, the controller brings the oxygen concentration of the oxygen rich air to within a range of 38 vol. % to under 64 vol. %; and when the amount of fuel gas supplied per ton of waste is 35 kg to under 40 kg, the controller brings the oxygen concentration of the oxygen rich air to within a range of 40 vol. % to under 66 vol. %.

Advantages of the Invention

As described above, with the present invention, upon the consumed quantity of coke to be used as a heating source for melting the thermal decomposition residue in the waste gasification melting furnace being decreased, and in place of the decreased quantity of coke, a fuel gas being used, the controller controls the amount of air to be mixed and the amount of oxygen to be mixed in the oxygen rich air supply apparatus so as to give an oxygen concentration of the oxygen rich air in accordance with the amount of fuel gas supplied to the tuyere from the fuel gas supply apparatus. The oxygen concentration of the oxygen rich air is controlled in accordance with the amount of fuel gas supplied such that the quantity of heat generated by combustion of the fuel gas and the coke in the furnace lower section is a sufficient quantity of heat to completely melt the thermal decomposition residue and raise the temperature of the molten slag to a temperature suitable for discharging it from the furnace. As a result of this, upon the fuel gas being supplied as an alternative to a part of the coke, even if the consumed quantity of coke is reduced and the consumed quantity of fuel gas is increased, the temperature of the furnace lower section is maintained high without the quantity of heat generated in the furnace lower section being lowered as compared to that in the case of using the coke alone, whereby melting of the thermal decomposition residue and discharging of the melt can be smoothly carried out. In addition, using the fuel gas as an alternative to a part of the coke can be efficiently performed, whereby the consumed quantity of coke can be decreased to cut the amount of carbon dioxide emission.

BEST MODE FOR CARRYING OUT THE INVENTION

Hereinbelow, an embodiment of the present invention will be explained with reference to the attached drawings. In the present embodiment, upon a gas mixture composed of oxygen rich air and a fuel gas being blown into the lower section of a waste gasification melting furnace of shaft furnace type, the oxygen concentration of the oxygen rich air is adjusted in accordance with the supply amount of the fuel gas, however, prior to explaining such a feature, the schematic configuration of the waste gasification melting furnace of shaft furnace type will be explained with reference to FIG. 1.

<Schematic Configuration of Waste Gasification Melting Furnace of Shaft Furnace Type>

Figure 1:
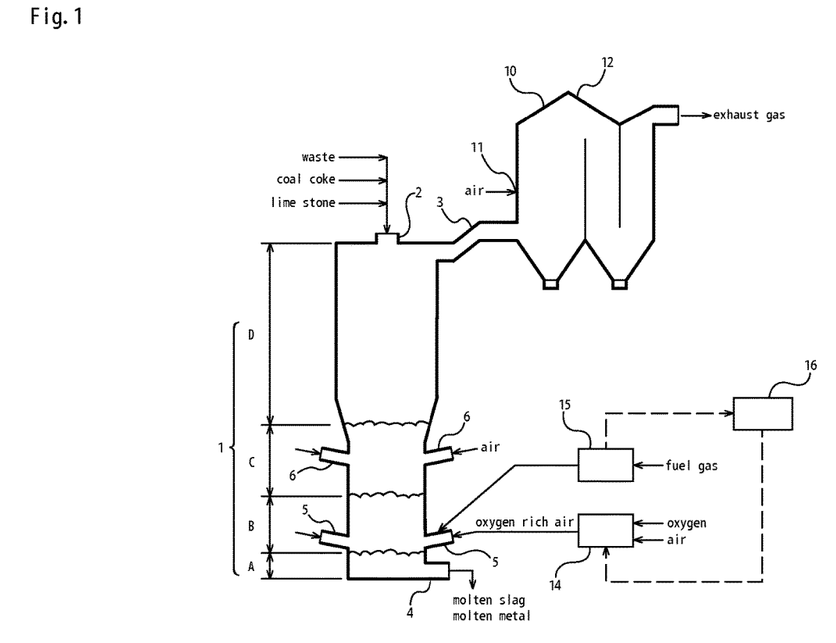
FIG. 1 is a figure showing a schematic configuration of a waste gasification melting apparatus as one embodiment of the present invention.

With a waste gasification melting furnace of shaft furnace type shown in FIG. 1 that is adopted in one embodiment of the present invention, the upper section of a gasification melting furnace 1 is provided with a charging port 2 for charging waste as an object to be treated, coke as fuel, and lime stone as a material for adjusting the slag composition into the furnace, and the side of the upper section is provided with a gas discharge port 3 for discharging the gas in the furnace to the outside thereof. In addition, the bottom section of the gasification melting furnace 1 is provided with a residue discharge port 4 for discharging the molten slag and the molten metal.

Above the waste gasification melting furnace 1, there is disposed a supply apparatus (not shown) which supplies waste, such as municipal waste, coke, and lime stone for use as a material for adjusting the composition of slag generated, respectively. The waste, the coke, and the lime stone, which are supplied by this supply apparatus, are conveyed by a carrying conveyor (not shown), and charged into the furnace from the charging port 2 in the furnace upper section.

The gas discharge port 3 is connected to a secondary combustion chamber 10 for burning the combustible gas generated by thermally decomposing the waste. The secondary combustion chamber 10 is provided with an air blowing port 11 through which air is blown for secondary combustion. In addition, adjacent to this secondary combustion chamber 10, a boiler 12 is provided in order to recover the heat from the combustion gas produced by burning the combustible gas in the secondary combustion chamber 10.

In addition, the exhaust gas from the boiler 12 is passed through a temperature lowering apparatus, a dust collector, and an exhaust gas treatment apparatus (these all not shown), which are provided on the downstream side of the boiler 12, thereby being made harmless before being dissipated to the atmosphere.

With the waste gasification melting furnace of shaft furnace type 1, the internal space of the waste gasification melting furnace 1 is divided into four regions along the vertical direction; from bottom, a coke packed layer A, a moving layer B, a gasification layer C, and a freeboard section D being formed. In the lower section of the furnace, the moving layer B and the coke packed layer A are formed. With such a waste gasification melting furnace 1, each of the moving layer B and the gasification layer C is provided with a tuyere for blowing oxygen-containing gas, or the like, into the furnace. The moving layer B in the lower section of the furnace is provided with a main tuyere 5, through which oxygen rich air and a fuel gas are blown into the furnace lower section. The gasification layer C is provided with a sub-tuyere 6, through which air is blown.

To the main tuyere 5, a gas feeding pipe (not shown) for blowing a gas mixture composed of oxygen rich air and a fuel gas into the furnace is connected, and to the gas feeding pipe, an oxygen rich air supply apparatus 14 and a fuel gas supply apparatus 15 are connected. The oxygen rich air supply apparatus 14 supplies oxygen rich air, which is obtained by mixing air with oxygen, to the gas feeding pipe, while the fuel gas supply apparatus 15 supplies a fuel gas to the gas feeding pipe. Inside of the gas feeding pipe, the oxygen rich air and the fuel gas are mixed to form a gas mixture. The gas feeding pipe may be of any type, provided that it has a structure which allows the oxygen rich air and the fuel gas to be mixed before combustion, and for example, a single pipe, a double pipe, a triple pipe, or the like, may be used.

In addition, the waste gasification melting apparatus of the present embodiment is provided with a controller 16, and the controller 16 adjusts the amounts of oxygen and air to be mixed in the oxygen rich air supply apparatus 14 for controlling the oxygen concentration of the oxygen rich air in accordance with the amount of the fuel gas to be supplied from the fuel gas supply apparatus 15 to the gas feeding pipe.

Next, how the oxygen concentration of the oxygen rich air is controlled by the controller 16 will be explained. First, an appropriate range of oxygen concentration of oxygen rich air for a specific amount of fuel gas supplied that allows the temperature of the lower section of the furnace to be maintained within the proper range has been worked out. With the total sum of the quantity of heat by coke combustion and the quantity of heat by fuel gas combustion inside of the entire furnace of the waste gasification melting furnace being defined to be constant, and the amount of oxygen supplied using the oxygen rich air being defined to be constant, the following study was performed. With the amount of coke supplied being decreased, and the amount of fuel gas supplied being increased in correspondence to such decrease, the temperature of the lower section of the furnace at that time was measured to thereby determine the oxygen concentration of the oxygen rich air that is required to maintain the temperature of the furnace lower section within the proper range.

The heating value in the lower section of the furnace at the time of burning the coke and the fuel gas is smaller than the heating value in the furnace lower section at the time of burning only the coke, by the quantity of fuel gas decomposition heat which is absorbed from the circumference. Then, the oxygen concentration of the oxygen rich air which is blown into the lower section of the furnace together with the fuel gas is enhanced as compared to that in the case of only the coke being burned, in other words, the ratio of nitrogen in the oxygen rich air is lowered to suppress the quantity of heat used for heating the nitrogen to a low value, thereby the temperature of the furnace lower section being maintained within the proper range such that melting of the thermal decomposition residue and temperature raising of the molten slag in the furnace lower section are properly performed. In correspondence to that the more the amount of coke supplied is decreased with the amount of fuel gas supplied being increased, the smaller the heating value in the furnace lower section will become, when the amount of fuel gas supplied is to be increased, the oxygen concentration of the oxygen rich air is controlled so as to be enhanced for decreasing the ratio of nitrogen.

Herein, "the proper range" of the temperature of the furnace lower section means a temperature range in which it is possible to implement sufficient melting of the thermal decomposition residue in the furnace lower section and smooth discharge of the molten slag from the furnace. With the temperature of the furnace lower section being raised to within the proper range, the thermal decomposition residue is sufficiently melted, and further, the temperature of the molten slag is sufficiently raised, a preferable fluidity being provided therefor, whereby smooth discharge thereof can be made.

With the total sum of the quantity of heat by coke combustion and the quantity of heat by fuel gas combustion inside of the entire furnace of the waste gasification melting furnace being defined to be constant, the amount of coke supplied is decreased, and in correspondence to such decrease, the amount of gas fuel supplied is increased. In addition, with the amount of oxygen to be supplied to the inside of the furnace by supplying the oxygen rich air being defined to be constant as a prescribed amount, the amounts of oxygen and air to be mixed by the oxygen rich air supply apparatus 14 are adjusted to make the oxygen concentration of the oxygen rich air to be proper. For example, the amount of oxygen to be mixed is increased with the amount of air being decreased, thereby the oxygen concentration being increased, while the amount of oxygen to be supplied to the inside of the furnace being held constant. In this way, with the amount of oxygen to be supplied to the inside of the furnace by supplying the oxygen rich air being defined to be constant as a prescribed amount, the appropriate range of oxygen concentration of oxygen rich air that is required to maintain the temperature of the furnace lower section within the proper range in accordance with the amount of fuel gas supplied was determined.

Figure 2:
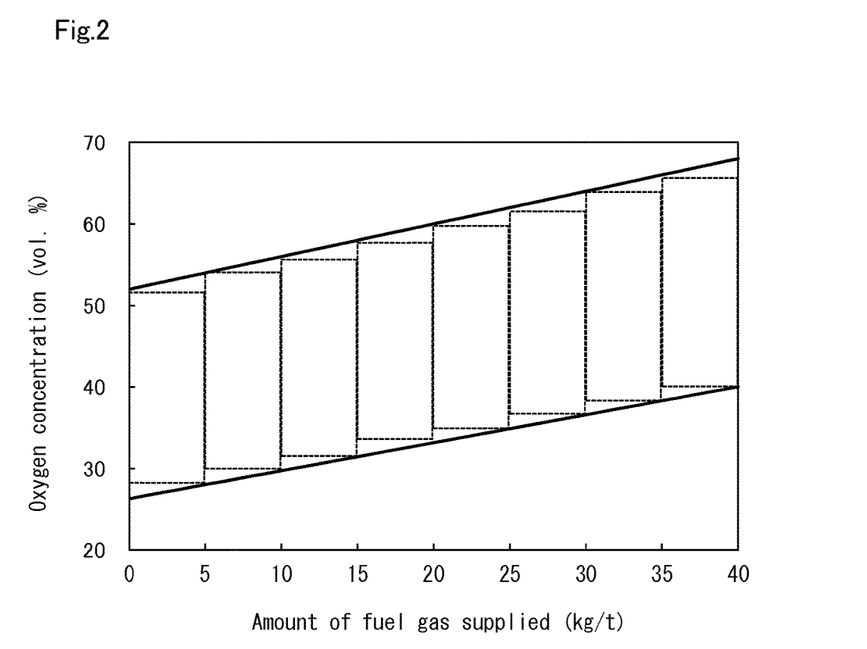
FIG. 2 is a graph showing a relation between the fuel gas supply amount and the oxygen concentration of oxygen rich air, being a graph indicating an appropriate range of oxygen concentration of oxygen rich air for a specific amount of fuel gas supplied that allows the temperature of the lower section of the furnace to be maintained within the proper range.

With a natural gas being used as the fuel gas, the above-described study was made. FIG. 2 is a graph showing the result of the above-described study, i.e., a graph showing a relation between the fuel gas supply amount and the oxygen concentration of oxygen rich air, being a graph indicating an appropriate range of oxygen concentration of oxygen rich air for a specific amount of fuel gas supplied that allows the temperature of the lower section of the furnace to be maintained within the proper range. The abscissa represents the amount of fuel gas supplied (amount of fuel gas supplied per ton of waste in kg/t), while the ordinate the oxygen concentration of oxygen rich air (vol. %). In the graph in FIG. 2, the upper and lower limit values of oxygen concentration of oxygen rich air that define the proper range of the temperature of the furnace lower section for a specific amount of fuel gas supplied are indicated with a solid line, respectively. Hereinbelow, the range between the upper limit value and the lower limit value is referred to as the "proper oxygen concentration range". The upper limit value is represented by Eq. (1) while the lower limit value is represented by Eq. (2).

$$Y=0.4X+52 \quad (1)$$

$$Y=0.343X+26.3 \quad (2)$$

where
X: Amount of fuel gas supplied per ton of waste (kg/t)
Y: Oxygen concentration of oxygen rich air (vol. %)

It is preferable that the oxygen concentration of the oxygen rich air prepared by the oxygen rich air supply apparatus be controlled to be brought to within a proper oxygen concentration range given by Eq. (3) in accordance with the amount of fuel gas supplied.

$$0.343X+26.3 \leq Y \leq 0.4X+52 \quad (3)$$

where
X: Amount of fuel gas supplied per ton of waste (kg/t)
Y: Oxygen concentration of oxygen rich air (vol. %)

If the oxygen concentration of the oxygen rich air for a specific amount of fuel gas supplied is lower than the proper oxygen concentration range, the ratio of nitrogen of the oxygen rich air will be high, thereby the quantity of heat used for heating of the nitrogen being increased, and thus the temperature of the furnace lower section cannot be raised to within the proper range; while, if the oxygen concentration of the oxygen rich air for a specific amount of fuel gas supplied is higher than the proper oxygen concentration range, there arises a problem that the combustion of the coke is excessively promoted, thereby the coke being consumed earlier, and thus the coke bed cannot be properly maintained.

As shown with broken lines in FIG. 2, if the proper oxygen concentration range is taken up every 5 kg/t of amount of fuel gas supplied, and a correspondence table between the amount of fuel gas supplied and the proper oxygen concentration range is prepared, the following Table 1 is given.

TABLE 1

| Amount of fuel gas supplied (kg/t) | Proper oxygen concentration range (vol. %) |
|---|---|
| 1 to under 5 | 28 to under 52 |
| 5 to under 10 | 30 to under 54 |
| 10 to under 15 | 31 to under 56 |
| 15 to under 20 | 33 to under 58 |
| 20 to under 25 | 35 to under 60 |
| 25 to under 30 | 37 to under 62 |
| 30 to under 35 | 38 to under 64 |
| 35 to under 40 | 40 to under 66 |

Upon the oxygen concentration of the oxygen rich air prepared by the oxygen rich air supply apparatus being to be controlled in accordance with the amount of fuel gas supplied, by performing the control such that the corresponding relationship between the amount of fuel gas supplied and the proper oxygen concentration range of the oxygen rich air, which is given by the Eq. (3) or Table 1, is satisfied, a sufficient quantity of heat to completely melt the thermal decomposition residue and raise the temperature of the molten slag to a temperature suitable for discharging it from the furnace can be reliably generated in the furnace lower section.

In the present embodiment, the corresponding relationship between the amount of fuel gas supplied and the proper oxygen concentration range of oxygen rich air (hereinbelow, to be referred to as "corresponding relationship"), which is given by the Eq. (3) or Table 1, is previously stored in the controller 16. The fuel gas supply apparatus 15 continuously or periodically sends data for the amount of fuel gas supplied to the main tuyere 5 to the controller 16. The controller 16 references the corresponding relationship, thereby identifying the proper oxygen concentration range of oxygen rich air that corresponds to the amount of fuel gas supplied that has been obtained from the fuel gas supply apparatus 15. Then, the controller 16 adjusts the amounts of oxygen and air to be mixed by the oxygen rich air supply apparatus 14 such that the oxygen concentration of the oxygen rich air to be supplied to the main tuyere 5 by the oxygen rich air supply apparatus 14 comes within the proper oxygen concentration range which has been identified as described above, thus controlling the oxygen concentration of the oxygen rich air. In this way, in accordance with the amount of fuel gas supplied from the fuel gas supply apparatus 15 to the gas feeding pipe, the oxygen concentration of the oxygen rich air is controlled. At this time, it is preferable that the amount of oxygen supplied to the inside of the furnace by supplying the oxygen rich air be constant as a prescribed amount. Adjustment of the amounts of oxygen and air to be mixed is performed by, for example, adjusting the degrees of opening of valves or dampers (not shown) in the oxygen supply system and the air supply system in the oxygen rich air supply apparatus 14.

How the oxygen concentration of the oxygen rich air is controlled will be specifically explained with reference to Table 1. For example, if the amount of fuel gas supplied is 13 kg/t, the oxygen concentration is controlled such that the oxygen concentration of the oxygen rich air is 31 vol. % to under 56 vol. %, and thereafter, the amount of fuel gas supplied is varied to, for example, 18 kg/t, the oxygen concentration is controlled such that the oxygen concentration is 33 vol. % to under 58 vol. %.

In the present embodiment, as described above, the controller 16 controls the oxygen concentration of the oxygen rich air which is prepared by the oxygen rich air supply apparatus 14 to be supplied to the inside of the furnace so as to be a proper concentration in accordance with the amount of fuel gas supplied. Such control allows the quantity of heat generated by combustion of the fuel gas and the coke in the lower section of the furnace to be a sufficient quantity of heat to completely melt the thermal decomposition residue and further raise the temperature of the molten slag to a temperature suitable for discharging it from the furnace, thus maintaining the temperature of the furnace lower section within the proper range. As a result of this, upon the fuel gas being supplied as an alternative to a part of the coke, even if the amount of coke supplied is reduced and the amount of fuel gas supplied is increased, the required quantity of heat can be obtained, whereby melting of the thermal decomposition residue and discharging of the melt can be smoothly carried out. In addition, using the fuel gas as an alternative to a part of the coke to employ the combustion heat thereof as a melting heat source can be efficiently performed, whereby the consumed quantity of coke can be decreased to cut the amount of carbon dioxide emission.

With the present embodiment apparatus thus configured, gasification melting treatment of the waste is performed in the following manner.

<Method of Gasification Melting with Waste Gasification Melting Furnace>

The waste, coke, and lime stone from the supply apparatus are charged into the furnace by a prescribed quantity, respectively, through the charging port 2 provided in the upper section of the gasification melting furnace 1, and from the main tuyere 5 and the sub-tuyere 6, a gas mixture or air is blown into the furnace, respectively. Particularly, from the main tuyere 5, a gas mixture which has been obtained by mixing the oxygen rich air supplied from the oxygen rich air supply apparatus 14 with the fuel gas supplied from the fuel gas supply apparatus 15 is blown into the furnace. Here, the oxygen rich air prepared by the oxygen rich air supply apparatus 14 has been adjusted to a proper oxygen concentration corresponding to the amount of fuel gas supplied as a result of the controller 16 controlling the oxygen concentration as described above.

The waste that has been charged from the charging port 2 is deposited in the inside of the furnace to form a waste gasification layer C, which is heated, dried, and then thermally decomposed by the high temperature combustion gas rising from the moving layer B of the furnace lower section and the air blown from the sub-tuyere 6. The combustion gas containing combustible gas generated by thermal decomposition is raised, a part of the combustible gas being burned in the freeboard section D, thereby the inside of the furnace being maintained at a prescribed temperature, and thus a treatment for decomposing the harmful gas and the tar component which have been generated by the thermal decomposition being performed. The gas which has passed through the freeboard section D is discharged from a gas discharge flue 3 provided in the upper section of the furnace into a secondary combustion chamber 10 outside the furnace. The gas, containing a large quantity of combustible gas, is burned in the secondary combustion chamber 10 with air being blown in the air blowing port 11, the heat being recovered at a boiler 12 to generate steam, which is used for electric power generation, or the like. The gas discharged from the boiler 12 is removed of relatively coarse dust particles by means of a cyclone separator; then is cooled by a temperature lowering apparatus (not shown); is removed of noxious gas through reaction with a harmful substance removing agent; and is subjected to an exhaust gas treatment, such as that for dust removal with a dust collector (not shown), being dissipated to the atmosphere from a smoke stack (not shown).

In the gasification layer C, the waste is thermally decomposed to generate a gas, then the fixed carbon produced by the thermal decomposition and the thermal decomposition residue (ash) fall together with the coke and the lime stone to form the moving layer B. In the moving layer B, with the oxygen rich air blown from the main tuyere 5, the coke, the fuel gas, and the fixed carbon in the waste are burned, and by the heat of combustion of these, the ash of the waste is melted, thereby a molten slag and a molten metal being generated. The lime stone functions as an adjusting material with which the property of the slag produced as a result of melting the ash is made preferable. Further, the high temperature combustion gas generated rises to provide a heating source for heating the waste for thermal decomposition thereof.

Under the main tuyere 5, there is formed the coke packed layer A in which the coke that has been heated to a high temperature, but has not been burned out is filled, holding the voids between lumps of coke, and the molten slag and the molten metal are dropped through the voids between lumps of coke to reach the bottom of the furnace. The molten slag and the molten metal are homogenized to be stabilized in property until they reach the bottom of the furnace; are discharged from a residue discharge port 4, which is provided at the furnace bottom; are supplied to a water-granulation apparatus (not shown) provided outside the furnace to be cooled and solidified; and the water-granulated slag and the water-granulated metal, which have been cooled and solidified, are recovered. The oxygen rich air blown from the main tuyere 5, and the high temperature combustion gas generated by combustion of the coke, the fuel gas, and the fixed carbon rise from the moving layer B to the gasification layer C to heat the waste, and the waste in the gasification layer C is partially oxidized by the air supplied from the sub-tuyere 6 and thermally decomposed. In the moving layer B, the coke and the fuel gas are burned to provide a heating source for ash melting and waste thermal decomposition; the coke holds voids between lumps of coke to provide a function of high temperature fire grate, which causes the oxygen rich air and the high temperature combustion gas to be passed, and the molten slag and the molten metal to be passed therethrough.

In the present embodiment, the controller 16 controls the oxygen concentration of the oxygen rich air which is prepared by the oxygen rich air supply apparatus 14 to be supplied to the inside of the furnace so as to be a proper concentration in accordance with the amount of fuel gas supplied from the fuel gas supply apparatus 15. The controller 16 adjusts the amounts of oxygen and air to be mixed by the oxygen rich air supply apparatus 14 such that the oxygen concentration of the oxygen rich air to be supplied to the main tuyere 5 by the oxygen rich air supply apparatus 14 comes within the proper oxygen concentration range which has been identified as described above, thus controlling the oxygen concentration of the oxygen rich air. In this way, in accordance with the amount of fuel gas supplied from the fuel gas supply apparatus 15 to the gas feeding pipe, the oxygen concentration of the oxygen rich air is controlled. At this time, it is preferable that the amount of oxygen supplied to the inside of the furnace by supplying the oxygen rich air be constant as a prescribed amount. Adjustment of the amounts of oxygen and air to be mixed is performed by, for example, adjusting the degrees of opening of valves or dampers (not shown) in the oxygen supply system and the air supply system in the oxygen rich air supply apparatus 14.

Such control allows the quantity of heat generated by combustion of the fuel gas and the coke in the lower section of the furnace to be a sufficient quantity of heat to completely melt the thermal decomposition residue and further raise the temperature of the molten slag to a temperature suitable for discharging it from the furnace, thus maintaining the temperature of the furnace lower section within the proper range. As a result of this, upon the fuel gas being supplied as an alternative to a part of the coke, even if the consumed quantity of coke is reduced and the consumed quantity of fuel gas is increased, the required quantity of heat can be obtained, whereby melting of the thermal decomposition residue and discharging of the melt can be smoothly carried out.

In this way, using the fuel gas as an alternative to a part of the coke to employ the combustion heat thereof as a melting heat source can be efficiently performed, whereby the consumed quantity of coke can be decreased to cut the amount of carbon dioxide emission.

In the present embodiment, only the gas mixture is blown from the main tuyere 5, however, alternatively, the dust recovered from the secondary combustion chamber 10 or the boiler 12 may be blown together with the gas mixture. In this way, in the case where the dust is blown together with the gas mixture, when the dust in the gas mixture reaches the moving layer B from the main tuyere 5, it is melted, and dropped through the coke packed layer together with the melt of the thermal decomposition residue to thereby be drawn out from the residue discharge port 4 in the bottom section of the furnace as a molten slag. In this way, if the dust is subjected to melting treatment to reduce the volume, the quantity for land-filling disposal can be greatly reduced, as compared to that in the case where the dust is disposed for land filling as it is.

DESCRIPTION OF SYMBOLS

The symbol 1 denotes a waste gasification melting furnace; 5 a main tuyere; 14 an oxygen rich air supply apparatus; 15 a fuel gas supply apparatus; and 16 a controller.

The invention claimed is:

1. A waste gasification melting apparatus, comprising:
    a waste gasification melting furnace of shaft furnace type having a coke bed to thermally decompose a waste and melt a thermal decomposition residue,
    an oxygen rich air supply apparatus for blowing oxygen rich air into the waste gasification melting furnace from a tuyere provided in a lower section of the furnace, and
    a fuel gas supply apparatus for blowing a fuel gas from the tuyere into the furnace,
    the oxygen rich air supply apparatus mixing air and oxygen to prepare oxygen rich air,
    there being provided a controller for controlling the oxygen rich air supply apparatus,
    a supply apparatus for supplying a quantity of coke to the waste gasification melting furnace,
    the waste gasification melting furnace being configured to decrease the quantity of coke to be supplied, and to supply a fuel gas in place of the decreased quantity of coke, the coke and fuel gas being burned by the oxygen rich air supplied from the tuyere provided at the furnace lower section, whereby the thermal decomposition residue are melted, consequently a molten slag and metal can be smoothly carried out of the furnace,
    the controller being previously stored with the corresponding relationship between the amount of fuel gas and the proper oxygen concentration range of oxygen rich air, and identifying the proper oxygen concentration range of oxygen rich air corresponding to the amount of fuel gas supplied, in receipt of the data of the amount of fuel gas from the fuel gas supply apparatus and using the above relationship, controlling the amount of air and oxygen to be mixed at the oxygen rich air supply apparatus, to keep the oxygen concentration in the proper oxygen concentration range of the oxygen rich air corresponding to the amount of fuel gas,
    the controller further enhancing the oxygen concentration of the oxygen rich air as compared to that in the case of only the coke being burned, so that the ratio of nitrogen in the oxygen rich air is to be lowered to suppress the quantity of heat used for heating the nitrogen to a low value, with combustion heat of coke and fuel gas the temperature of the furnace lower section being maintained within the proper range such that melting of the thermal decomposition residue and temperature raising of the molten slag in the furnace lower section are properly performed, by decreasing the amount of coke supplied, and increasing the amount of fuel gas for enhancing the oxygen concentration of the oxygen rich air by decreasing the ratio of nitrogen.

2. The waste gasification melting apparatus according to claim 1, wherein the controller brings the oxygen concentration of the oxygen rich air prepared by the oxygen rich air supply apparatus to within a range given by the following Eq. (1) in accordance with the amount of fuel gas supplied:

$$0.343X+26.3 \le Y \le 0.4X+52 \quad (1)$$

where
    X: Amount of fuel gas supplied per ton of waste (kg/t)
    Y: Oxygen concentration of oxygen rich air (vol. %).

3. The waste gasification melting apparatus according to claim 1, wherein
    the controller controls the oxygen concentration of the oxygen rich air prepared by the oxygen rich air supply apparatus in the following way in accordance with the amount of fuel gas supplied:
    when the amount of fuel gas supplied per ton of waste is 1 kg to under 5 kg, the controller brings the oxygen concentration of the oxygen rich air to within a range of 28 vol. % to under 52 vol. %, when the amount of fuel gas supplied per ton of waste is 5 kg to under 10 kg, the controller brings the oxygen concentration of the oxygen rich air to within a range of 30 vol. % to under 54 vol. %, when the amount of fuel gas supplied per ton of waste is 10 kg to under 15 kg, the controller brings the oxygen concentration of the oxygen rich air to 31 vol. % to within a range of under 56 vol. %, when the amount of fuel gas supplied per ton of waste is 15 kg to under 20 kg, the controller brings the oxygen concentration of the oxygen rich air to within a range of 33 vol. % to under 58 vol. %, when the amount of fuel gas supplied per ton of waste is 20 kg to under 25 kg, the controller brings the oxygen concentration of the oxygen rich air to within a range of 35 vol. % to under 60 vol. %, when the amount of fuel gas supplied per ton of waste is 25 kg to under 30 kg, the controller brings the oxygen concentration of the oxygen rich air to within a range of 37 vol. % to under 62 vol. %, when the amount of fuel gas supplied per ton of waste is 30 kg to under 35 kg, the controller brings the oxygen concentration of the oxygen rich air to within a range of 38 vol. % to under 64 vol. %, and when the amount of fuel gas supplied per ton of waste is 35 kg to under 40 kg, the controller brings the oxygen concentration of the oxygen rich air to within a range of 40 vol. % to under 66 vol. %.

4. A waste gasification melting apparatus, comprising:

a waste gasification melting furnace of shaft furnace type having a coke bed to thermally decompose a waste and melt a thermal decomposition residue, an oxygen rich air supply apparatus for blowing oxygen rich air into the waste gasification melting furnace from a tuyere provided in a lower section of the furnace, and a fuel gas supply apparatus for blowing a fuel gas from the tuyere into the furnace, the oxygen rich air supply apparatus mixing air and oxygen to prepare oxygen rich air, there being provided a controller for controlling the oxygen rich air supply apparatus, a supply apparatus for supplying a quantity of coke to the waste gasification melting furnace, the waste gasification melting furnace being configured to decrease the quantity of coke to be supplied, and to supply a fuel gas in place of the decreased quantity of coke, the coke and fuel gas being burned by the oxygen rich air supplied from the tuyere provided at the furnace lower section, whereby the thermal decomposition residue are melted, consequently a molten slag and metal can be smoothly carried out of the furnace, the controller being previously stored with the corresponding relationship between the amount of fuel gas and the proper oxygen concentration range of oxygen rich air, and identifying the proper oxygen concentration range of oxygen rich air corresponding to the amount of fuel gas supplied, in receipt of the data of the amount of fuel gas from the fuel gas supply apparatus and using the above relationship, controlling the amount of air and oxygen to be mixed at the oxygen rich air supply apparatus, to keep the oxygen concentration in the proper oxygen concentration range of the oxygen rich air corresponding to the amount of fuel gas, and to make the amount of oxygen in the oxygen rich air supplied to be constant, the controller further enhancing the oxygen concentration of the oxygen rich air as compared to that in the case of only the coke being burned, so that the ratio of nitrogen in the oxygen rich air is to be lowered to suppress the quantity of heat used for heating the nitrogen to a low value, with combustion heat of coke and fuel gas the temperature of the furnace lower section being maintained within the proper range such that melting of the thermal decomposition residue and temperature raising of the molten slag in the furnace lower section are properly performed, by decreasing the amount of coke supplied, and increasing the amount of fuel gas for enhancing the oxygen concentration of the oxygen rich air by decreasing the ratio of nitrogen.

5. The waste gasification melting apparatus according to claim 4, wherein the controller brings the oxygen concentration of the oxygen rich air prepared by the oxygen rich air supply apparatus to within a range given by the following Eq. (1) in accordance with the amount of fuel gas supplied:

$$0.343X + 26.3 \leq Y \leq 0.4X + 52 \tag{1}$$

where

X: Amount of fuel gas supplied per ton of waste (kg/t)

Y: Oxygen concentration of oxygen rich air (vol. %).

6. The waste gasification melting apparatus according to claim 4, wherein the controller controls the oxygen concentration of the oxygen rich air prepared by the oxygen rich air supply apparatus in the following way in accordance with the amount of fuel gas supplied:

when the amount of fuel gas supplied per ton of waste is 1 kg to under 5 kg, the controller brings the oxygen concentration of the oxygen rich air to within a range of 28 vol. % to under 52 vol. %, when the amount of fuel gas supplied per ton of waste is 5 kg to under 10 kg, the controller brings the oxygen concentration of the oxygen rich air to within a range of 30 vol. % to under 54 vol. %, when the amount of fuel gas supplied per ton of waste is 10 kg to under 15 kg, the controller brings the oxygen concentration of the oxygen rich air to 31 vol. % to within a range of under 56 vol. %, when the amount of fuel gas supplied per ton of waste is 15 kg to under 20 kg, the controller brings the oxygen concentration of the oxygen rich air to within a range of 33 vol. % to under 58 vol. %, when the amount of fuel gas supplied per ton of waste is 20 kg to under 25 kg, the controller brings the oxygen concentration of the oxygen rich air to within a range of 35 vol. % to under 60 vol. %, when the amount of fuel gas supplied per ton of waste is 25 kg to under 30 kg, the controller brings the oxygen concentration of the oxygen rich air to within a range of 37 vol. % to under 62 vol. %, when the amount of fuel gas supplied per ton of waste is 30 kg to under 35 kg, the controller brings the oxygen concentration of the oxygen rich air to within a range of 38 vol. % to under 64 vol. %, and when the amount of fuel gas supplied per ton of waste is 35 kg to under 40 kg, the controller brings the oxygen concentration of the oxygen rich air to within a range of 40 vol. % to under 66 vol. %.

7. A waste gasification melting apparatus, comprising:

a waste gasification melting furnace of shaft furnace type having a coke bed to thermally decompose a waste and melt a thermal decomposition residue, an oxygen rich air supply apparatus for blowing oxygen rich air into the waste gasification melting furnace from a tuyere provided in a lower section of the furnace, and a fuel gas supply apparatus for blowing a fuel gas from the tuyere into the furnace, a supply apparatus for supplying a quantity of coke to the waste gasification melting furnace, the waste gasification melting furnace being configured to decrease the quantity of coke to be supplied, and to supply fuel gas in place of the decreased quantity of coke, the coke and fuel gas being burned by the oxygen rich air supplied from the tuyere provided at the furnace lower section, whereby the thermal decomposition residue are melted, consequently a molten slag and metal can be smoothly carried out of the furnace, the fuel gas supply apparatus supplying the fuel gas at an amount of fuel gas of which combustion heat corresponds to that of the amount of coke having been decreased as compared to that in the case of only the coke being burned, so as to make the total sum of the quantity of heat by coke combustion and the quantity of heat by fuel gas combustion to be constant, the oxygen rich air supply apparatus mixing air and oxygen to prepare oxygen rich air, there being provided a controller for controlling the oxygen rich air supply apparatus, the controller being previously stored with the corresponding relationship between the amount of fuel gas and the proper oxygen concentration range of oxygen rich air, and identifying the proper oxygen concentration range of oxygen rich air corresponding to the amount of fuel gas supplied, in receipt of the data of the amount of fuel gas from the fuel gas supply apparatus and using the above relationship, controlling the amount of air and oxygen to be mixed at the oxygen rich air supply apparatus, to keep the oxygen concentration in the proper oxygen concentration range of the oxygen rich air corresponding to the amount of fuel gas, the controller further enhancing the oxygen concentration of the oxygen rich air as compared to that in the case of only the coke being burned, so that the ratio of nitrogen in the oxygen rich air is to be lowered to suppress the quantity of heat used for heating the nitrogen to a low value, with combustion heat of coke and fuel gas the temperature of the furnace lower section being maintained within the proper range such that melting of the thermal decomposition residue and temperature raising of the molten slag in the furnace lower section are properly performed, by decreasing the amount of coke supplied, and increasing the amount of fuel gas for enhancing the oxygen concentration of the oxygen rich air by decreasing the ratio of nitrogen.

8. The waste gasification melting apparatus according to claim 7, wherein the controller brings the oxygen concentration of the oxygen rich air prepared by the oxygen rich air supply apparatus to within a range given by the following Eq. (1) in accordance with the amount of fuel gas supplied:

$$0.343X+26.3 \leq Y \leq 0.4X+52 \quad (1)$$

where
X: Amount of fuel gas supplied per ton of waste (kg/t)
Y: Oxygen concentration of oxygen rich air (vol. %).

9. The waste gasification melting apparatus according to claim 7, wherein
the controller controls the oxygen concentration of the oxygen rich air prepared by the oxygen rich air supply apparatus in the following way in accordance with the amount of fuel gas supplied:

when the amount of fuel gas supplied per ton of waste is 1 kg to under 5 kg, the controller brings the oxygen concentration of the oxygen rich air to within a range of 28 vol. % to under 52 vol. %, when the amount of fuel gas supplied per ton of waste is 5 kg to under 10 kg, the controller brings the oxygen concentration of the oxygen rich air to within a range of 30 vol. % to under 54 vol. %, when the amount of fuel gas supplied per ton of waste is 10 kg to under 15 kg, the controller brings the oxygen concentration of the oxygen rich air to 31 vol. % to within a range of under 56 vol. %, when the amount of fuel gas supplied per ton of waste is 15 kg to under 20 kg, the controller brings the oxygen concentration of the oxygen rich air to within a range of 33 vol. % to under 58 vol. %, when the amount of fuel gas supplied per ton of waste is 20 kg to under 25 kg, the controller brings the oxygen concentration of the oxygen rich air to within a range of 35 vol. % to under 60 vol. %, when the amount of fuel gas supplied per ton of waste is 25 kg to under 30 kg, the controller brings the oxygen concentration of the oxygen rich air to within a range of 37 vol. % to under 62 vol. %, when the amount of fuel gas supplied per ton of waste is 30 kg to under 35 kg, the controller brings the oxygen concentration of the oxygen rich air to within a range of 38 vol. % to under 64 vol. %, and
when the amount of fuel gas supplied per ton of waste is 35 kg to under 40 kg, the controller brings the oxygen concentration of the oxygen rich air to within a range of 40 vol. % to under 66 vol. %.

10. A waste gasification melting method, the method, upon thermally decomposing a waste and melting a thermal decomposition residue in a waste gasification melting furnace of shaft furnace type having a coke bed and a supply apparatus for supplying a quantity of coke to the waste gasification melting furnace, blowing oxygen rich air produced by mixing air and oxygen at an oxygen rich air supply apparatus into the waste gasification melting furnace from a fuel gas supply apparatus through a tuyere provided in the lower section of the furnace, and blowing a fuel gas from the tuyere into the furnace, comprising:

decreasing the quantity of coke to be supplied, in the waste gasification melting furnace, and supplying a fuel gas in place of the decreased quantity of coke, the coke and fuel gas being burned by the oxygen rich air supplied from the tuyere provided at the furnace lower section, whereby the thermal decomposition residue are melted, consequently a molten slag and metal can be smoothly carried out of the furnace, the method having a controlling step for controlling the amount of the air and the oxygen to be mixed at the oxygen rich air supply apparatus by a controller, in the controlling step, the controller being previously stored with the corresponding relationship between the amount of fuel gas and the proper oxygen concentration range of oxygen rich air, and identifying the proper oxygen concentration range of oxygen rich air corresponding to the amount of fuel gas supplied, in receipt of the data of the amount of fuel gas from the fuel gas supply apparatus and using the above relationship, controlling the amount of air and oxygen to be mixed at the oxygen rich air supply apparatus, to keep the oxygen concentration in the proper oxygen concentration range of the oxygen rich air corresponding to the amount of fuel gas, in the controlling step, the controller further enhancing the oxygen concentration of the oxygen rich air as compared to that in the case of only the coke being burned, so that the ratio of nitrogen in the oxygen rich air is to be lowered to suppress the quantity of heat used for heating the nitrogen to a low value, with combustion heat of coke and fuel gas the temperature of the furnace lower section being maintained within the proper range such that melting of the thermal decomposition residue and temperature raising of the molten slag in the furnace lower section are properly performed, by decreasing the amount of coke supplied, and increasing the amount of fuel gas for enhancing the oxygen concentration of the oxygen rich air by decreasing the ratio of nitrogen.

11. The waste gasification melting method according to claim 10, wherein the oxygen concentration of the oxygen rich air is controlled to be brought to within a range given by the following Eq. (1) in accordance with the amount of fuel gas supplied:

$$0.343X+26.3 \leq Y \leq 0.4X+52 \qquad (1)$$

where

X: Amount of fuel gas supplied per ton of waste (kg/t)
Y: Oxygen concentration of oxygen rich air (vol. %).

12. The waste gasification melting method according to claim 10, wherein the oxygen concentration of the oxygen rich air is controlled in the following way in accordance with the amount of fuel gas supplied:

when the amount of fuel gas supplied per ton of waste is 1 kg to under 5 kg, the controller brings the oxygen concentration of the oxygen rich air to within a range of 28 vol. % to under 52 vol. %, when the amount of fuel gas supplied per ton of waste is 5 kg to under 10 kg, the controller brings the oxygen concentration of the oxygen rich air to within a range of 30 vol. % to under 54 vol. %, when the amount of fuel gas supplied per ton of waste is 10 kg to under 15 kg, the controller brings the oxygen concentration of the oxygen rich air to within a range of 31 vol. % to under 56 vol. %, when the amount of fuel gas supplied per ton of waste is 15 kg to under 20 kg, the controller brings the oxygen concentration of the oxygen rich air to within a range of 33 vol. % to under 58 vol. %, when the amount of fuel gas supplied per ton of waste is 20 kg to under 25 kg, the controller brings the oxygen concentration of the oxygen rich air to within a range of 35 vol. % to under 60 vol. %, when the amount of fuel gas supplied per ton of waste is 25 kg to under 30 kg, the controller brings the oxygen concentration of the oxygen rich air to within a range of 37 vol. % to under 62 vol. %, when the amount of fuel gas supplied per ton of waste is 30 kg to under 35 kg, the controller brings the oxygen concentration of the oxygen rich air to within a range of 38 vol. % to under 64 vol. %, and when the amount of fuel gas supplied per ton of waste is 35 kg to under 40 kg, the controller brings the oxygen concentration of the oxygen rich air to within a range of 40 vol. % to under 66 vol. %.

13. A waste gasification melting method, the method, upon thermally decomposing a waste and melting a thermal decomposition residue in a waste gasification melting furnace of shaft furnace type having a coke bed and a supply apparatus for supplying a quantity of coke to the waste gasification melting furnace, blowing oxygen rich air produced by mixing air and oxygen at an oxygen rich air supply apparatus into the waste gasification melting furnace from a fuel gas supply apparatus through a tuyere provided in the lower section of the furnace, and blowing a fuel gas from the tuyere into the furnace, comprising:

decreasing the quantity of coke to be supplied, in the waste gasification melting furnace, and supplying a fuel gas in place of the decreased quantity of coke, the coke and fuel gas being burned by the oxygen rich air supplied from the tuyere provided at the furnace lower section, whereby the thermal decomposition residue are melted, consequently a molten slag and metal can be smoothly carried out of the furnace, the method having a controlling step for controlling the amount of the air and the oxygen to be mixed at the oxygen rich air supply apparatus by a controller, in the controlling step, the controller being previously stored with the corresponding relationship between the amount of fuel gas and the proper oxygen concentration range of oxygen rich air, and identifying the proper oxygen concentration range of oxygen rich air corresponding to the amount of fuel gas supplied, in receipt of the data of the amount of fuel gas from the fuel gas supply apparatus and using the above relationship, controlling the amount of air and oxygen to be mixed at the oxygen rich air supply apparatus, to keep the oxygen concentration in the proper oxygen concentration range of the oxygen rich air corresponding to the amount of fuel gas, and to make the amount of oxygen in the oxygen rich air supplied to be constant, in the controlling step, the controller further enhancing the oxygen concentration of the oxygen rich air as compared to that in the case of only the coke being burned, so that the ratio of nitrogen in the oxygen rich air is to be lowered to suppress the quantity of heat used for heating the nitrogen to a low value, with combustion heat of coke and fuel gas the temperature of the furnace lower section being maintained within the proper range such that melting of the thermal decomposition residue and temperature raising of the molten slag in the furnace lower section are properly performed, by decreasing the amount of coke supplied, and increasing the amount of fuel gas for enhancing the oxygen concentration of the oxygen rich air by decreasing the ratio of nitrogen.

14. The waste gasification melting method according to claim 13, wherein the oxygen concentration of the oxygen rich air is controlled to be brought to within a range given by the following Eq. (1) in accordance with the amount of fuel gas supplied:

$$0.343X+26.3 \leq Y \leq 0.4X+52 \qquad (1)$$

where

X: Amount of fuel gas supplied per ton of waste (kg/t)
Y: Oxygen concentration of oxygen rich air (vol. %).

15. The waste gasification melting method according to claim 13, wherein the oxygen concentration of the oxygen rich air is controlled in the following way in accordance with the amount of fuel gas supplied:

when the amount of fuel gas supplied per ton of waste is 1 kg to under 5 kg, the controller brings the oxygen concentration of the oxygen rich air to within a range of 28 vol. % to under 52 vol. %, when the amount of fuel gas supplied per ton of waste is 5 kg to under 10 kg, the controller brings the oxygen concentration of the oxygen rich air to within a range of 30 vol. % to under 54 vol. %, when the amount of fuel gas supplied per ton of waste is 10 kg to under 15 kg, the controller brings the oxygen concentration of the oxygen rich air to within a range of 31 vol. % to under 56 vol. %, when the amount of fuel gas supplied per ton of waste is 15 kg to under 20 kg, the controller brings the oxygen concentration of the oxygen rich air to within a range of 33 vol. % to under 58 vol. %, when the amount of fuel gas supplied per ton of waste is 20 kg to under 25 kg, the controller brings the oxygen concentration of the oxygen rich air to within a range of 35 vol. % to under 60 vol. %, when the amount of fuel gas supplied per ton of waste is 25 kg to under 30 kg, the controller brings the oxygen concentration of the oxygen rich air to within a range of 37 vol. % to under 62 vol. %, when the amount of fuel gas supplied per ton of waste is 30 kg to under 35 kg, the controller brings the oxygen concentration of the oxygen rich air to within a range of 38 vol. % to under 64 vol. %, and when the amount of fuel gas supplied per ton of waste is 35 kg to under 40 kg, the controller brings the oxygen concentration of the oxygen rich air to within a range of 40 vol. % to under 66 vol. %.

16. A waste gasification melting method, the method, upon thermally decomposing a waste and melting a thermal decomposition residue in a waste gasification melting furnace of shaft furnace type having a coke bed and a supply apparatus for supplying a quantity of coke to the waste gasification melting furnace, blowing oxygen rich air produced by mixing air and oxygen at an oxygen rich air supply apparatus into the waste gasification melting furnace from a fuel gas supply apparatus through a tuyere provided in the lower section of the furnace, and blowing a fuel gas from the tuyere into the furnace, comprising:

decreasing the quantity of coke to be supplied, in the waste gasification melting furnace, and supplying a fuel gas in place of the decreased quantity of coke, the coke and fuel gas being burned by the oxygen rich air supplied from the tuyere provided at the furnace lower section, whereby the thermal decomposition residue are melted, consequently a molten slag and metal can be smoothly carried out of the furnace, supplying the fuel gas at an amount of fuel gas supplied, corresponding to the amount of supplied coke, decreased as compared to that in the case of only the coke being burned, so as to make the total sum of the quantity of heat by coke combustion and the quantity of heat by fuel gas combustion to be constant, the method having a controlling step for controlling the amount of the air and the oxygen to be mixed at the oxygen rich air supply apparatus by a controller, in the controlling step, the controller being previously stored with the corresponding relationship between the amount of fuel gas and the proper oxygen concentration range of oxygen rich air, and identifying the proper oxygen concentration range of oxygen rich air corresponding to the amount of fuel gas supplied, in receipt of the data of the amount of fuel gas from the fuel gas supply apparatus and using the above relationship, controlling the amount of air and oxygen to be mixed at the oxygen rich air supply apparatus, to keep the oxygen concentration in the proper oxygen concentration range of the oxygen rich air corresponding to the amount of fuel gas, in the controlling step, the controller further enhancing the oxygen concentration of the oxygen rich air as compared to that in the case of only the coke being burned, so that the ratio of nitrogen in the oxygen rich air is to be lowered to suppress the quantity of heat used for heating the nitrogen to a low value, with combustion heat of coke and fuel gas the temperature of the furnace lower section being maintained within the proper range such that melting of the thermal decomposition residue and temperature raising of the molten slag in the furnace lower section are properly performed, by decreasing the amount of coke supplied, and increasing the amount of fuel gas for enhancing the oxygen concentration of the oxygen rich air by decreasing the ratio of nitrogen.

17. The waste gasification melting method according to claim 16, wherein the oxygen concentration of the oxygen rich air is controlled to be brought to within a range given by the following Eq. (1) in accordance with the amount of fuel gas supplied:

$$0.343X + 26.3 \leq Y \leq 0.4X + 52 \tag{1}$$

where
X: Amount of fuel gas supplied per ton of waste (kg/t)
Y: Oxygen concentration of oxygen rich air (vol. %).

18. The waste gasification melting method according to claim 16, wherein
the oxygen concentration of the oxygen rich air is controlled in the following way in accordance with the amount of fuel gas supplied:

when the amount of fuel gas supplied per ton of waste is 1 kg to under 5 kg, the controller brings the oxygen concentration of the oxygen rich air to within a range of 28 vol. % to under 52 vol. %, when the amount of fuel gas supplied per ton of waste is 5 kg to under 10 kg, the controller brings the oxygen concentration of the oxygen rich air to within a range of 30 vol. % to under 54 vol. %, when the amount of fuel gas supplied per ton of waste is 10 kg to under 15 kg, the controller brings the oxygen concentration of the oxygen rich air to within a range of 31 vol. % to under 56 vol. %, when the amount of fuel gas supplied per ton of waste is 15 kg to under 20 kg, the controller brings the oxygen concentration of the oxygen rich air to within a range of 33 vol. % to under 58 vol. %, when the amount of fuel gas supplied per ton of waste is 20 kg to under 25 kg, the controller brings the oxygen concentration of the oxygen rich air to within a range of 35 vol. % to under 60 vol. %, when the amount of fuel gas supplied per ton of waste is 25 kg to under 30 kg, the controller brings the oxygen concentration of the oxygen rich air to within a range of 37 vol. % to under 62 vol. %, when the amount of fuel gas supplied per ton of waste is 30 kg to under 35 kg, the controller brings the oxygen concentration of the oxygen rich air to within a range of 38 vol. % to under 64 vol. %, and when the amount of fuel gas supplied per ton of waste is 35 kg to under 40 kg, the controller brings the oxygen concentration of the oxygen rich air to within a range of 40 vol. % to under 66 vol. %.

* * * * *